United States Patent [19]

Denzinger et al.

[11] Patent Number: 5,227,446

[45] Date of Patent: Jul. 13, 1993

[54] GRAFT COPOLYMERS OF MONOSACCHARIDES, OLIGOSACCHARIDES, POLYSACCHARIDES AND MODIFIED POLYSACCHARIDES, THE PREPARATION THEREOF, AND THEIR USE

[75] Inventors: Walter Denzinger, Speyer; Heinrich Hartmann, Limburgerhof; Alexander Kud, Eppelsheim; Richard Baur, Mutterstadt; John Feldmann, Mannheim; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 649,063

[22] Filed: Feb. 1, 1991

[30] Foreign Application Priority Data

Feb. 3, 1990 [DE] Fed. Rep. of Germany ....... 4003172

[51] Int. Cl.$^5$ .................. C08F 220/04; C08F 222/02; C08F 251/00
[52] U.S. Cl. .................. 527/314; 526/238.2; 526/318.2
[58] Field of Search ........................... 527/314

[56] References Cited

U.S. PATENT DOCUMENTS 3,558,499 1/1971 Galvin et al. ............. 252/526
4,897,215 1/1990 Trieselt et al. ............. 252/174.24
4,963,629 10/1990 Driemel et al. ............. 526/200

FOREIGN PATENT DOCUMENTS 0025551 9/1980 European Pat. Off. .
0075820 9/1982 European Pat. Off. .
0404377 12/1990 European Pat. Off. .
55-155097 12/1980 Japan .
61-031498 2/1986 Japan .

OTHER PUBLICATIONS

World Patents Index Latest, Woche 8613, Feb. 13, 1986, Derwent Publications Ltd., London, GB: An 86-085028 & JP-A061 031 498 (Sanyo Chem. Ind.) Feb. 13, 1986.
World Patents Index Latest, Woche 8106, Dec. 4, 1980, Derwent Publications Ltd, London, GB: An 81-08817D: & JP-A-55 155 097 (Nichiden Kagaku).

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Graft copolymers obtainable by free radical-initiated copolymerization of
(A) a monomer mixture comprising
  (a) a monoethylenically unsaturated $C_4$- to $C_8$-dicarboxylic acid, or an anhydride, alkali metal salt or ammonium salt thereof,
  (b) a monoethylenically unsaturated $C_3$- to $C_{10}$-carboxylic acid, or an alkali metal salt or ammonium salt thereof,
  (c) if desired another monoethylenically unsaturated monomer which can be copolymerized with monomer (a) and (b), and
  (d) a monomer containing two or more ethylenically unsaturated, non-conjugated double bonds in the molecule,
in the presence of
(B) a monosaccharide, oligosaccharide, polysaccharide, oxidatively, hydrolytically or enzymatically degraded polysaccharide, oxidized, hydrolytically or enzymatically degraded polysaccharide, or chemically modified monosaccharide, oligosaccharide or polysaccharide, in the weight ratio (A):(B) of (95 to 20):(5 to 80), a process for the preparation of the graft copolymers, and detergents and cleaners containing the graft copolymers in amounts of from 0.1 to 20% by weight, are described.

3 Claims, No Drawings

GRAFT COPOLYMERS OF MONOSACCHARIDES, OLIGOSACCHARIDES, POLYSACCHARIDES AND MODIFIED POLYSACCHARIDES, THE PREPARATION THEREOF, AND THEIR USE

U.S. Pat. No. 3,558,499 disclosed detergents which contain, as essential constituents, from about 10 to about 25% of an anionic or nonionic surfactant, from about 60 to about 89.9% of an inorganic builder, such as sodium tripolyphosphate, sodium, carbonate or sodium silicate, and from about 0.1 to about 10% by weight of an antigraying agent, which comprise a graft polymer of starch with acrylic acid or methacrylic acid. The content of polymerized acrylic acid or methacrylic acid in the graft polymer is from about 1 to 50%.

JP-A-55/155,097 discloses detergent formulations which contain, in order to suppress resoiling during washing, form 0.05 to 5% by weight of a grafted starch prepared by polymerizing form 0.5 to 100 parts by weight of water-soluble monomer or a monomer which becomes water-soluble on hydrolysis, in the presence of 100 parts by weight of starch. According to the examples, an oxidized starch grafted with sodium acrylate (8 parts by weight of sodium acrylate per 100 parts by weight of oxidized starch) and an oxidized starch grafted with hydroxypropyl methacrylate (2.5 parts by weight of hydroxypropyl acrylate per 100 parts by weight of starch) and a corn starch-polyvinyl alcohol graft polymer (100 parts by weight of corn starch/5 parts by weight of vinyl acetate, degree of hydrolysis 63%) were used.

JP-A-61/031,498 discloses detergents which contain, as builders, from 0.05 to 50% by weight of graft polymers comprising a monosaccharide and/or an oligosaccharide and a water-soluble, ethylenically unsaturated monomer. In the examples, acrylic acid was grafted onto sucrose or glucose. As shown in the Examples and Comparative Examples of this publication, addition of polyacrylic acid to a detergent formulation increases the detergency to a greater extent than does the addition of the same amount of a starch grafted with acrylic acid or methacrylic acid. In contrast to polyacrylic acid, which is virtually non-biodegradable, grafted starches are to a large extent biodegradable.

European Patent 0,075,820 discloses the preparation of copolymers comprising monoethylenically unsaturated dicarboxylic acids and monoethylenically unsaturated monocarboxylic acids. In this known preparation process, the degree of neutralization of the carboxylic acid groups of the monomers during the polymerization is from 20 to 80%. In this way, copolymers having low contents of residual dicarboxylic acid are obtained.

European Patent 0,025,551 discloses the use of copolymers comprising, for example, maleic acid and acrylic acid as encrustation inhibitors in detergents.

It is an object of the present invention to provide novel substances which have improved effectiveness in detergents compared with comparable known products. The novel substances should in addition be substantially biodegradable or should at least allow elimination from the effluent from sewage plants. It is a further object of the invention to use large amounts of replenishable raw materials to further improve the ecological acceptance while having a property profile comparable to that of purely synthetic detergent additives.

We have found that this object is achieved by graft copolymers of monosaccharides, oligosaccharides, polysaccharides and derivatives therefor, which are obtainable by free radical-initiated copolymerization of
(A) a monomer mixture comprising
 (a) from 90 to 10% by weight of a monoethylenically unsaturated $C_4$- to $C_8$-dicarboxylic acid, or an anhydride, alkali metal salt or ammonium salt thereof,
 (b) from 10 to 90% by weight of a monoethylenically unsaturated $C_3$- to $C_{10}$-carboxylic acid, or an alkali metal salt or ammonium salt thereof,
 (c) from 0 to 40% by weight of another monoethylenically unsaturated monomer which can be copolymerized with monomers (a) and (b), and
 (d) from 0 to 5% by weight of a monomer containing two or more ethylenically unsaturated double bonds in the molecule,
 in the presence of
(B) a monosaccharide, oligosaccharide, polysaccharide, oxidatively, hydrolytically or enzymatically degraded polysaccharide treated thermically or mechanically, oxidized, hydrolytically or enzymatically degraded polysaccharide, or chemically modified monosaccharide, oligosaccharide or polysaccharide, or a mixture of said compounds,
in the weight ratio (A):(B) of (95 to 20):(5 to 80).

These graft copolymers are used as additives for detergents and cleaners in amounts of from 0.1 to 20% by weight, based on the particular formulation.

The graft copolymers are obtainable by copolymerizing (A) a monomer mixture in the presence of (B) a natural product based on a monosaccharide, oligosaccharide or polysaccharide or a derivative thereof. The monomer mixture (A) contains, as the group (a) monomer, a monoethylenically unsaturated $C_4$- to $C_8$-dicarboxylic acid, or an anhydride, alkali metal salt and/or ammonium salt thereof. Examples of suitable dicarboxylic acids are maleic acid, fumaric acid, itaconic acid, mesaconic acid, methylenemalonic acid, citraconic acid, maleic anhydride, itaconic anhydride and methylenemalonic anhydride. The ethylenically unsaturated dicarboxylic acids can be employed in the copolymerization in the form of free acids or after neutralization with alkali metal bases, ammonia or amines. The group (a) monomer is preferably maleic acid, maleic anhydride, itaconic acid, itaconic anhydride or a sodium, potassium or ammonium salt of maleic acid or itaconic acid. These salts ar obtainable, for example, in a simple manner from maleic anhydride or itaconic anhydride by neutralizing said anhydride in aqueous solution using sodium hydroxide solution, potassium hydroxide solution or ammonia. The group (a) monomer is present in the monomer mixture to the extent of from 10 to 90% by weight, preferably from 12 to 80% by weight, particularly preferably from 15 to 60% by weight.

Suitable group (b) monomers are monoethylenically unsaturated $C_3$- to $C_1$-carboxylic acids and alkali metal salts and/or ammonium salts thereof. These monomers include, for example, acrylic acid, methacrylic acid, dimethylacrylic acid, ethylacrylic acid, allylacetic acid and vinylacetic acid. Preferred monomers from this group are acrylic acid, methacrylic acid, mixtures thereof, and the sodium, potassium or ammonium salts or mixtures thereof.

The group (c) monomers which may be employed, if desired, in the graft copolymerization include, for example, $C_1$- to $C_8$-alkyl esters and hydroxyalkyl esters of the compounds mentioned under (a) and (b), for example methyl acrylate, ethyl acrylate, n-butyl acrylate, methyl methacrylate, monomethyl maleate, dimethyl maleate, monoethyl maleate, diethyl maleate, hydroxyethyl acrylate, hydroxypropyl acrylates, hydroxybutyl acrylates, hydroxyethyl methacrylate and hydroxypropyl methacrylates. Suitable group (c) monomers are also the amides and N-substituted alkylamides of the compounds indicated under (a) and (b), for example acrylamide, methacrylamide, N-alkylacrylamides having from 1 to 18 carbon atoms in the alkyl, for example N-methylacrylamide, N-dimethylacrylamide, N-tert.-butylacrylamide, N-octadecylacrylamide, N-ethylhexylmaleamide, N-dodecylmaleamide, dimethylaminopropylmethacrylamide and acrylamidoglycolic acid. Suitable group (c) monomers are also those containing sulfo groups, for example vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid, and those containing phosphonic acid groups, for example vinylphosphonic acid, allylphosphonic acid and acrylamidomethylpropanephosphonic acid. This group of monomers also include N-vinylpyrrolidone, N-vinylcaprolactam, N-vinylformamide, N-vinyl-N-methylformamide, 1-vinylimidazole, 1-vinyl-2-methylimidazole, vinyl acetate and vinyl propionate. Further suitable group (c) monomers are the esters of alkoxylated $C_1$- to $C_{18}$-alcohols which have been reacted with from 2 to 50 mol of ethylene oxide, propylene oxide, butylene oxide or a mixture thereof, with the monoethylenically unsaturated carboxylic acid from group (a) or (b), e.g. the esters of acrylic acid, methacrylic acid or maleic acid with a $C_{13}/C_{15}$-oxoalcohol which has been reacted with various amounts of ethylene oxide, e.g. 3 mol, 5 mol, 7 mol, 10 mol or 30 mol of ethylene oxide.

Suitable esters of dicarboxylic acids are both monoesters and diesters.

Other suitable group (c) monomers are amides of monoethylenically unsaturated $C_3$- to $C_8$-carboxylic acids containing amide groups of the structure

where $R^1$ is

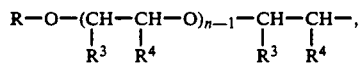

$R^3$ and $R^4$ are H, $CH_3$, or $C_2H_5$,
R is $C_1$- to $C_{28}$-alkyl,
n is from 2 to 100, and
$R^2$ is H or $R^1$.

The monomers of components (c) are only employed, if at all, to modify the graft copolymers and are in such cases present in the monomer mixtures employed in the polymerization to the extent of up to 40% by weight.

Preferred group (c) monomers are hydroxyethyl acrylate, hydroxypropyl acrylates, vinyl acetate, N-vinylpyrrolidone and acrylamidomethylpropanesulfonic acid.

A further modification of the graft copolymers can be achieved if the monomer mixtures contain up to 5% by weight of a monomer containing two or more ethylenically unsaturated, non-conjugated double bonds in the molecule. These compounds are usually used as crosslinking agents in copolymerization reactions. They can be added to the monomer mixtures of (a) and (b) or (a), (b) and (c) employed in the copolymerization. They are preferably used, if at all, in an amount of from 0.05 to 2% by weight. The use of a group (d) monomer during the copolymerization increases the K value of the copolymer. Examples of suitable compounds of this type are methylenebisacrylamide, esters of acrylic acid and methacrylic acid with polyhydric alcohols, e.g. glycol diacrylate, glycerol triacrylate, glycol dimethacrylate, glyercol trimethacrylate, and polyols which have been diesterified or polyesterified with acrylic acid or methacrylic acid, such as pentaerythritol and glucose. Other suitable crosslinking agents are divinylbenzene, divinyldioxane, pentaerythritol triallyl ether and pentaallylsucrose. In this group of compounds, preference is given to water-soluble monomers, such as glycol diacrylate or glycol diacrylates of polyethylene glycols having a molecular weight of up to 3000.

The polymerization of the monomers (a) and (b) and, if desired, additionally (c) and (d) is carried out in the presence of natural products based on polysaccharides, oligosaccharides, monosaccharides and derivatives thereof. The natural products are, for example, saccharides of vegetable or animal origin or products of the metabolism of microorganisms, and the degradation and modification products thereof which are already dispersible or soluble in water or alkalis or become dispersible or soluble during the polymerization of the monomers (a) and (b) and, if used (c) and/or (d) directly or after partial or full neutralization using alkalis, ammonia or amines.

Examples of these products are pectin, algin, chitin, chitosan, heparin, carrageenan, agar, gum arabic, tragacanth, karaya gum, ghatti gum, carob pod meal, guar gum, tara gum, inulin, xanthan, dextran, nigeran and pentosans, such as xylan and araban, whose principal constituents comprise D-glucuronic acid, D-galacturonic acid, methyl D-galacturonate, D-mannuronic acid, L-guluronic acid, D and L-galactose, 3,6-anhydro-D-galactose, L-arabinose, L-rhamnose, D-glucuronic acid, D-xylose, L-fucose, D-mannose, D-fructose, D-glucose, 2-amino-2-deoxy-D-glucose and 2-amino-2-deoxy-D-galactose, and the N-acetyl derivatives thereof.

From the point of view of economy, the polysaccharides used for component (B) in the graft copolymerization are preferably starch, thermal and/or mechanically treated starch, oxidatively, hydrolytically or enzymatically degraded starches, oxidized, hydrolytically or enzymatically degraded starches and chemically modified starches, and chemically modified monosaccharides and oligosaccharides. In principle, all starches are suitable, but preferred starches are those from corn, wheat, rice, tapioca and in particular potatoes. Starches are virtually insoluble in water and can be converted into a waster-soluble form in a known manner by thermal and/or mechanical treatment or by enzymatic or acid-catalyzed degradation. Specific examples of starch degradation products obtainable either by oxidative, hydrolytic or enzymatic degradation are: dextrin, such as white and yellow dextrins, maltodextrins, glucose syrups, maltose syrups, hydrolysates with a high content of D-glucose, and maltose and D-glucose and their isomerization product fructose. Of course, monosaccharides and oligosaccharides, such as galactose, mannose, ribose, sucrose raffinose, lactose and trehalose, and products of the degradation of cellulose, for example cellobiose and oligomers thereof, are also suitable as component (B).

Colorless or very pale yellow aqueous solutions of the graft polymers are obtained, in particular, when component (B) is a starch which has been degraded enzymatically or by acid catalysts. These starches are commercially available and known as starch saccharification products. They contain from 0.5 to 95% by weight, preferably from 8 to 20% by weight, of dextrose and from 3 to 30% by weight, preferably 5 to 20% by weight, of maltose, and from 2 to 90% by weight of maltotriose and higher sugars.

Component (B) can also comprise oxidized starches, e.g. dialdehyde starch, and oxidized degradation products of starch, for example gluconic acid, glucaric acid and glucuronic acid. Such compounds are obtained, for example, by oxidizing starch using periodate, chromic acid, hydrogen peroxide, nitrogen dioxide, nitrogen tetroxide, nitric acid or hypochlorite.

Component (B) may additionally comprise chemically modified polysaccharides, in particular chemically modified starches, e.g. starches and starch degradation products which have been reacted with acids to form esters and with alcohols to form ethers. The esterification of these substances is possible both using inorganic acids and organic acids, or the anhydrides or chlorides thereof. In the case of direct esterification, the liberated water results in acid-catalyzed cleavage of glycosidic bonds. Of particular industrial interest are phosphated and acetylated starches and starch degradation products. The most common method of etherifying starch is treatment of starch or starch degradation products with organic halogen compounds, epoxides or sulfates in aqueous alkaline solution. Examples of starch ethers are alkyl ethers, hydroxyalkyl ethers, carboxyalkyl ethers and allyl ethers. Chemically modified starches in component (B) are also cationically modified starches, e.g. starches reacted with 2,3-epoxypropyltrimethylammonium chloride, as described, for example, in U.S. Pat. No. 3,649,616.

Chemically modified polysaccharides also include, for example, carboxymethylcellulose, hydroxyethylcellulose, hydroxypropylcellulose, carboxymethylhydroxyethylcellulose, sulfoethylcellulose, carboxymethylsulfoethylcellulose, hydroxypropylsulfoethylcellulose, hydroxyethylsulfoethylcellulose, methylsulfoethylcellulose and ethylsulfoethylcellulose.

Component (B) comprises, in particular, chemically modified degraded starches, for example products of the hydrogenation of starch hydrolysates, such as sorbitol and mannitol, maltitol and in particular hydrogenated glucose syrups, since they can be used to prepare colorless graft copolymers which do not discolor even on prolonged storage. Other compounds suitable as component (B) are hydrogenated glucose syrups oxidized, hydrolytically or enzymatically degraded starches.

Other suitable compounds are the products of the acid-catalyzed or enzymatic transglycosidation or glycosidation, e.g. methyl glucoside.

To prepare the graft copolymers, monomers (a) and (b) and, if desired, (c) and (d) are subjected to free-radical polymerization in the presence of compounds of component (B). In some cases, it may be favorable for the action of the resultant graft polymer, to employ two or more of the compounds given under (B), e.g. mixtures of hydrolytically or enzymatically degraded starches and gluconic acid, mixtures of a monosaccharide and an oligosaccharide, mixtures of an enzymatically degraded starch and a monosaccharide or mixtures of glucose and sucrose or mannose. The polymerization can be carried out either in the presence or absence of inert solvents or inert diluents. Since the polymerization in the absence of inert solvents or diluents usually results in non-uniform uniform graft copolymers, the graft copolymerization is preferably carried out in an inert solvent or diluent. Examples of suitable inert diluents are those in which the compounds given under (B) can be suspended and which dissolve the monomers (A). In these cases, the graft copolymers are in suspended form after the copolymerization and can easily be isolated in solid form by filtration. Examples of suitable inert diluents are toluene, xylene, o-, m- and p-xylene and isomer mixtures, ethylbenzene, aliphatic hydrocarbons, such as pentane, hexane, heptane, octane, nonane, dodecane, cyclohexane, cyclooctane, methylcyclohexane and mixtures of the said hydrocarbons or petroleum fractions which contain no polymerizable monomers. Also suitable are chlorinated hydrocarbons, such as chloroform, carbon tetrachloride, hexachloroethane, dichloroethane and tetrachloroethane. In the above-described procedure, in which the compounds of component (B) are suspended in an inert diluent, anhydrous compounds of component (B) are preferred, and preferred compounds from group (a) monomers are the anhydrides. A preferred preparation method for the graft copolymers is solution polymerization, the compounds of component (B), the monomers (A) and the graft copolymer formed being at least in dispersed from, preferably in dissolved form. Inert solvents, such as methanol, ethanol, ispropanol, n-propanol, n-butanol, sec.-butanol, tetrahydrofuran, dioxane, and mixtures of said inert solvents are suitable, for example, for the solution polymerization. The copolymerization can be carried out continuously or batchwise. Components (A) and (B) can, as stated above, also be copolymerized in the absence of inert diluents or solvents. Continuous polymerization at from 160° to 250° C. is particularly suitable in this case. Although the absence of polymerization initiators is possible here, the reaction is preferably carried out using catalysts which form free radicals under the polymerization conditions, e.g. inorganic and organic peroxides, persulfates, azo compounds and redox catalysts.

The graft copolymers are generally prepared in the presence of free radical-forming initiators.

Preferably any compound which has a half-life of less than 3 hours at the polymerization temperature selected in each case is suitable as a free radical-forming initiator. If the polymerization is first initiated at low temperature and completed at elevated temperature, it is expedient to use two or more initiators which decompose at different temperatures, namely to first employ an initiator which decomposes at low temperature for initiating the polymerization and then to complete the principal polymerization using an initiator which decomposes at elevated temperature. Water-soluble and water-insoluble initiators or mixtures of the two can be employed. The water-insoluble initiators are then soluble in the organic phase. Examples of initiators which can be used are those indicated below for the temperature ranges indicated.

Temperature: 40° to 60° C.: Acetylcyclohexanesulfonyl peroxide, diacetyl peroxydicarbonate, dicyclohexyl peroxydicarbonate, di-2-ethylhexyl peroxydicarbonate, tert.-butyl perneodecanoate, 2,2'-azobis(4-methoxy-2,4-dimethylvaleronitrile), 2,2'-azobis(2-methyl-N-phenylpropionamidine) dihydrochloride and 2,2'-azobis(2-methylpropionamidine) dihydrochloride.

Temperature: 60° to 80° C.: tert.-Butyl perpivalate, dioctanoyl peroxide, dilauroyl peroxide and 2,2'-azobis(2,4-dimethylvaleronitrile).

Temperature 80° to 100° C.: Dibenzoyl peroxide, tert.-butyl per-2-ethylhexanoate, tert.-butyl permaleate, 2,2'-azobis(isobutyronitrile), dimethyl 2,2'-azobisisobutyrate, sodium persulfate, potassium persulfate and ammonium persulfate.

Temperature: 100° to 120° C.: bis(tert.-Butyl peroxide) cyclohexane, tert.-butyl peroxyisopropyl carbonate, tert.-butyl peracetate and hydrogen peroxide.

Temperature: 120° to 140° C.: 2,2-bis(tert.-Butylperoxy)butane, dicumyl peroxide, di-tert.-amyl peroxide and di-tert.-butyl peroxide.

Temperature: >140° C.: p-Methane hydroperoxide, pinane hydroperoxide, cumene hydroperoxide and tert.-butyl hydroperoxide.

If, in addition to said initiators, salts or complexes of heavy metals, e.g. salts of copper, cobalt, manganese, iron, vanadium, nickel or chromium, or organic compounds, such as benzoin, dimethylaniline or ascorbic acid, are used, the half lives of said free radical-forming initiators can be reduced. Thus, for example, addition of only 5 ppm of copper(II) acetylacetonate activates tert.-butyl hydroperoxide to such an extent that the polymerization can be carried out at only 100° C. The reducing component of the redox catalysts can also be formed, for example, from compounds such as sodium sulfite, sodium bisulfite, sodium formaldehyde sulfoxylate and hydrazine. Based on the monomers employed in the polymerization, from 0.01 to 20% by weight, preferably from 0.05 to 10% by weight, or a polymerization initiator or of a mixture of a plurality of polymerization initiators is used. As the redox component, from 0.01 to 15% of the reducing compound are added. Heavy metals are employed in the range from 0.1 to 100 ppm, preferably from 0.05 to 10 ppm. It is frequently advantageous to employ a combination of peroxide, reducing agent and heavy metal as the redox catalyst.

The copolymerization of the essential monomers (a) and (b) and of the optional monomers (c) and/or (d) can also be carried out under the action of ultra-violet radiation, if necessary in the presence of UV initiators. In this case, photoinitiators or sensitizers which are customary for this purpose, for example compounds such as benzoin and benzoin ether, α-methylbenzoin or α-phenylbenzoin, are suitable. It is also possible to use triplet sensitizers, such as benzyl diketals. Examples of UV sources ar high-energy UV lamps, such as carbon arc lamps, mercury vapor lamps, xenon lamps, and low-UV light sources, such as fluorescent tubes with a high blue content.

To prepare polymers having a low K value, the graft copolymerization is expediently carried out in the presence of regulators. Examples of suitable regulators are mercapto compounds, such as mercaptoethanol mercaptopropanol, mercaptobutanol, mercaptoacetic acid, mercaptopropionic acid, butyl mercaptan and dodecyl mercaptan. Further suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols.

If the polymerization is carried out in the presence of regulators, from 0.05 to 20% by weight thereof are required, based on the monomers employed in the polymerization.

In order to prepare colorless or only weakly colored graft copolymers from components (A) and (B), the copolymerization is carried out in the presence of water-soluble phosphorus compounds in which the phosphorus has an oxidation number of from 1 to 4, or the water-soluble alkali metal or ammonium salts, water-soluble $PO(OH)_2$-containing compounds and/or water-soluble salts thereof. Phosphorus acid is preferred. For reducing the coloration of the graft copolymers, the suitable phosphorus compounds are used in amounts of from 0.01 to 5% by weight, based on the monomers (A) employed. The suitable phosphorus compounds are described in EP-A-0,175,317.

The copolymerization of components (A) and (B) is usually carried out in an inert gas atmosphere with exclusion of atmospheric oxygen. Good mixing of the reactants is generally ensured during the polymerization. In the case of smaller bathes, where reliable dissipation of the heat of polymerization is ensured, the reactants, preferably in an inert diluent, can be copolymerized batchwise by heating the reaction mixture to the polymerization temperature, i.e. to from 40° to 150° C. However, this method gives graft copolymers which have a relatively high content of nonpolymerized dicarboxylic acid. In order to provide better control of the polymerization reaction, the monomers (A) are therefore added continuously or batchwise to the polymerizing mixture after initiation of the copolymerization at such a rate that the graft copolymerization is easily controllable in the desired temperature range. A preferred method of adding the monomers of components (A) involves first introducing the compounds of component (B) or at least a portion of the compounds of component (B) into the polymerization reactor together with one or more monomer (a) and to heat the mixture with stirring to the desired polymerization temperature. As soon as this temperature has been reached, the monomers (b) and, if used, (c) and/or (d) and the initiator and, if necessary, a regulator are then added over a period of from about 1 to 10 hours, preferably from 2 to 8 hours. A procedure of this type is used, for example, in the polymerization of components (A) and (B) in an inert diluent in which component (B) is suspended, and in graft copolymerization in solution.

The graft copolymers are preferably prepared in aqueous medium by suspension or solution polymerization of components (A) and (B), solution polymerization in water being particularly preferred. In the latter case, an illustrative procedure involves introducing the monomers (a) and at least a portion of the compounds of component (B) in aqueous medium into the reactor and adding the monomers (b) and, if used, the monomers (c) and/or (d) continuously or in portions to the polymerizing reaction mixture, and carrying out the copolymerization in such a manner that the degree of neutralization of the copolymerized monomer units (a) and (b) on completion of the graft copolymerization, i.e. when 95% or more, preferably 98-99%, of the monomers have been polymerized, is from 20 to 80%. The monomers (a) employed at the beginning of the polymerization have preferably already been neutralized to the extent of 20% or more. In the case of graft copolymerization in aqueous medium, the entire amount of the compounds of component (B) or only a portion thereof, e.g. 50%, can be introduced together with the monomers (a), and the remainder added continuously or in portions to the polymerizing reaction mixture together with the monomers (b) and, if used, the monomers (c) and/or (d). To obtain graft copolymers having low residual contents of nonpolymerized monomers (a), i.e., in particular, maleic acid, it is important that the degree of neutralization of the monomers be monitored during the copolymerization. It should be from 20 to 80%, preferably 30 to 70%, during the graft copolymerization. One possibility here is to partially neutralize the monomers (a) and (b) so that their degree of neutralization is already in the stated range, but it is also possible to neutralize the group (a) monomers introduced into the reactor completely or to the extent of about 90% and to add the group (b) monomers in non-neutralized form, so that the overall degree of neutralization of the monomers (a) and (b) and, if used, (c), i.e. if (c) is an acid-containing monomer, e.g. acrylamidopropanesulfonic acid or vinyl-phosphoric acid, drops during the polymerization to values in the range of from 20 to 80% from around 100% or about 90% initially. In order to maintains a certain degree of neutralization of the monomers (a) and (b) within this range, a base, e.g. sodium hydroxide solution, potassium hydroxide solution, ammonia or ethanolamine, can be added during the copolymerization. Depending on the composition of the graft copolymers, the majority, i.e. from 60 to 80%, of the monomers (a) and (b) is polymerized at a degree of neutralization of from 20 to 80%. The solution copolymerization is particularly preferably curred out using hydrogen peroxide, sodium persulfate or a mixture in any desired ratio as the initiator. For this purpose, from 0.5 to 20% by weight of initiator are required, based on the monomers (A). A relatively small amount of initiator is employed if the monomer mixtures (A) comprise a small proportion of group (a) monomers, and a larger amount of initiator is employed in the content of monomers (a) is high, e.g. from about 15 to 18% by weight of initiator are employed for 90% by weight of monomers (a). The procedure here again involves introducing at least some of component (B) into the rector together with the monomers (a), which have preferably been neutralized to the extent of 90% or more, and adding the monomers (b) and, if used, the monomers (c) and/or (d) while maintaining the required degree of neutralization of from 20 to 80 %. The degree of neutralization of the monomers (b) can be adjusted either by separately adding appropriate amounts of base or by adding partially neutralized monomers (b) to the reaction mixture. The degree of neutralization of the partially neutralized monomers (b) is then in the range from 20 to 80%.

As stated above, polysaccharides can be subjected to the graft polymerization in aqueous suspension. However, graft copolymers of polysaccharides are preferably prepared by first converting a water-insoluble polysaccharide in aqueous suspension with addition of enzymes and/or acids into a water-soluble form and subjecting the resultant aqueous solution of the degraded polysaccharide to the graft copolymerization. In this case, a water-insoluble polysaccharide, for example potato starch, is first suspended in water and degraded. This degradation can be carried out in a conventional manner under the action of enzymes, e.g. α- or β-amylase, or debranching enzymes, e.g. pullulanase, or under the action of inorganic or organic acids. Examples of suitable inorganic acids are phosphoric acid, sulfuric acid, hydrochloric acid and nitric acid. Examples of suitable organic acids are saturated or unsaturated carboxylic acids, e.g. formic acid, acetic acid, propionic acid, acrylic acid, methacrylic acid, maleic acid, itaconic acid, p-toluenesulfonic acid and benzensulfonic acid. The conversion of the polysaccharides into a water-soluble form is preferably carried out using a monomer (a) which is subsequently employed in the graft copolymerization. Thus, for example, potato starch or corn starch can be hydrolytically degraded in a simple manner at from 50° to 150° C. in aqueous suspension by adding maleic acid or itaconic acid. As soon as the starch has reached the desired degree of degradation, the added maleic acid or itaconic acid is neutralized to the extent of 20% or more, preferably 90%, and the graft copolymerization is carried out by adding the monomers (b) and, if desired, (c) and/or (d).

The enzymatic degradation of starch is carried out at from 30° to 120° C., and the hydrolytic degradation of starch takes at from 50° to 150° C. The hydrolytic degradation takes from about 5 minutes to 10 hours, and the degree of degradation depends on the temperature, pH and time. Further details on the degradation of starch can be obtained from literature, cf., for example Günther Tegge, Stärke and Stärkederivate, Behr's Verlag, Hamburg 1984. In some cases, it has proven advantageous to add one or more of the phosphorus compounds which, according to EP-A-0,175,317, result in polymers with only weak coloration or none at all, as early as the enzymatic or hydrolytic degradation of the starch.

During the graft copolymerization, the temperatures are usually in the range from 40° to 180° C., preferably from 60° to 150° C., in particular from 70° to 110° C. As soon as the temperature in the copolymerization is above the boiling point of the inert diluent or solvent or of the monomers, the copolymerization is carried out under pressure. The concentration of components (A) and (B) in the copolymerization in the presence of inert solvents or diluents is from 10 to 80% by weight, preferably from 20 to 70% by weight. The graft copolymers can be prepared in conventional polymerization apparatuses, for example stirred reactors, fitted with an anchor, paddle, impeller or multistage impulse countercurrent stirrer. In particular when no diluent is used, it may be advantageous to carry out the graft copolymerization in a compounder. The use of a compounder may also be necessary if the polymerization is carried out at high concentrations or if the natural products are of high molecular weights and initially swell considerably.

Graft copolymers which, if there are soluble in water, have K values of from 8 to 250, preferably from 10 to 150 (measured on 1% strength by weight aqueous solutions of the copolymers at pH 7 at 25° C.), are obtained. The graft copolymers which can be prepared by the abovementioned process are colorless to brownish products. In the case of polymerization in aqueous medium, they are in the form of dispersions or polymer solutions. Depending on the particular composition of the graft copolymers, these are low viscosity to pasty aqueous solutions or aqueous dispersion.

The high-molecular-weight graft copolymers, i.e. those having K values of from 120 to 250, are preferably used as thickeners for aqueous systems. Applications of this type are, for example, addition of the graft copolymers to paper coating materials in order to increase the viscosity and water retention of said material, addition to aqueous point dispersions and addition as thickeners in pigmented printing pastes. Graft copolymers having a K value of from 8 to 90, preferably from 20 to 75, are particularly advantageously used as an addition to detergents and cleaners for textiles and hard surfaces in amounts of from 0.1 to 20% by weight, preferably from 0.5 to 12% by weight, based on the detergent or cleaner formulation. Graft copolymers in this K value range have an excellent encrustation-inhibiting action in phosphate-free and low-phosphate detergents (i.e. phosphate contents of less than 25% by weight). Graft copolymers having K values of from 8 to about 35 can likewise be used as an addition to detergents, like those graft copolymers having K values of 75 or more. In detergents, the low-molecular-weight graft copolymers additionally cause dispersion of the particulate dirt during washing and prevent resoiling of the textile materials to be washed. In addition, they frequently have a viscosity-reducing effect in detergent slurries. It is therefore frequently advantageous to employ a mixture of graft copolymers having are relatively high K value and those having a low K value as additives for detergents. The high-molecular-weight graft copolymers act as thickeners in detergent formulation.

The graft copolymers having K values of from 8 or 90 are highly suitable as additives to dishwasher detergents. At levels of from 0.1 to 20% by weight, preferably 0.5 to 12% by weight, they prevent deposits on crockery, cutlery and glassware.

Compared with the hitherto used copolymers based on ethylenically unsaturated monomers, the abovedescribed graft copolymers, due to the natural products present, are biodegradable or at least can be eliminated from the sewage plant effluent together with the sewage sludge. A particularly noteworthy fact is that graft copolymers having a natural products content of abut 40% by weight of a polysaccharide, a degraded polysaccharide, an oligosaccharide or a monosaccharide have an encrustation-inhibiting effect in textile detergent which is at least comparable or even in some cases better than the highly effective copolymers comprising monomers (a) and (b) which are known from European Patent 0,025,551 as encrustation inhibitors in textile detergents. For example, mixtures of degraded starch, an oligosaccharide or monosaccharide and the copolymers comprising monomers (a) and (b) containing about 40% of natural products are considerably less effective as encrustation inhibitors when added to textile detergents compared with the graft copolymers described. The same applies to the graft polymers of acrylic acid on polysaccharides or degradation products thereof which are know from the prior art mentioned at the outset.

The graft copolymers according to the invention back be employed both in liquid and powder detergents and cleaners. Compared with the copolymers comprising group (a) and (b) monomers known form European Patent 0,025,551, they have, in particular, improved compatibility in liquid detergent formulations.

The composition of detergent formulations may vary widely. The same applies to the composition of cleaner formulation. Detergent and cleaner formulations usually contains surfactants and possibly builders. These data apply both to liquid and powder detergents and cleaners. Examples of detergent formulations which are customary in Europe, in the U.S.A. and in Japan are given in tabular form, for example, in Chemical and Engn. News, Volume 67 (1989), 35.

The above-described graft copolymers are employed according to the invention is detergents which contain up to 45% by weight of phosphate, preferably in detergents having a reduced phosphate content (for the purpose of the invention, these have a phosphate content of less than 25% by weight of sodium triphosphate) or in phosphate-free detergents and in cleaners. The copolymers can be added to the detergent formulation in the form of granules, a paste, a high viscosity composition, as a dispersion or as a solution in a solvent. The graft copolymers can also be adsorbed at the surface of solid diluents, e.g. sodium sulfate or builders (zeolites or bentonites) and other solid adjuncts in the detergent formulation.

Detergent and cleaner formulations are in powder or liquid form. They may have different compositions in different regions and for specific applications.

Universal domestic detergents for drum washing machines, as are widely used in Europe, usually contain from 5 to 10% by weight of anionic surfactants, from 1 to 5% by weight of nonionic surfactants, from 1 to 5% by weight of foam regulators, such as silicone oils or soaps, from 0 to 40% by weight of softeners, such as soda or pentasodium triphosphate, which may be partially or completely replaced by the compounds according to the invention, from 0 to 30% by weight of ion exchangers, such as zeolite A, from 2 to 7% by weight of sodium silicates as corrosion inhibitors, from 10 to 30% by weight of bleaches, such as sodium perborate, sodium percarbonate, organic peracids or salts thereof, from 0 to 5% by weight of bleach activators, such as tetraacetylethylenediamine, pentaacetylglucose, hexaacetylsorbitol or acyloxybenzenesulfonate, stabilizers, such as magnesium silicate or ethylenediamine tetraacetate, antigraying agents, such as carboxymethylcellulose, methyl- and hydroxyalkylcelluloses, vinyl acetate-grafted polyglycols, oligomeric and polymeric terephtalic acid/ethylene glycol/polyethylene glycol esters, enzymes, optical whiteners, fragrances, plasticizers, dyes and diluents.

By contrast, heavy duty detergents, which are used in the U.S.A. and Japan and neighboring states in tub washing machines, usually contain no bleaches; to make up for this, their content of anionic surfactants is from two to three times as high, the contain more washing alkalis, such as soda and sodium silicates (in general up to 25% by weight), and they usually also contain no bleach activators and bleach stabilizers. The contents of surfactants and other ingredients may also be considerably higher in detergent concentrates, which are sold containing only a small amount of diluent, if any. Detergents for delicate articles, coloreds, wool and hand washing usually also contain no bleaches and small amounts of alkaline constituents, with a correspondingly increased surfactant content.

Detergents for the commercial sector are formulated for the special conditions of industrial washing (soft water, continuous washing), which allow targeting of the type of materials being washed and the type of soiling. Combinations are therefore used in which one constituent predominates or others are entirely missing and can be added separately if needed. For this reason, the surfactants, builders, alkalis and bleaches in these detergents vary within road limits.

Examples of suitable anionic surfactants for the abovementioned powder detergents are sodium alkylbenzenesulfonates, fatty alcohol sulfates and fatty alcohol polyglycol ether sulfates. Examples of individual compounds of this type are $C_8$-to $C_{12}$-alkylbenzenesulfonates, $C_{12}$- to $C_{16}$-alkanesulfonates, $C_{12}$- to $C_{16}$-alkyl sulfates, $C_{12}$- to $C_{16}$-alkyl sufosuccinates and sulfated, ethoxylated $C_{12}$- to $C_{16}$-alkanols. Other suitable anionic surfactants are sulfated fatty acid alkanolamines, α-sulfo (fatty acid) esters, fatty acid monoglycerides or products of the reaction of from 1 to 4 mol of ethylene oxide with primary or secondary fatty alcohols or alkylphenols. Further suitable anionic surfactants are fatty acid esters or amides of hydroxy- or aminocarboxylic acids or -sulfonic acids, for example fatty acid sarcosides, glycolates, lactates, taurides and isethionates. The anionic surfactants may be in the form of sodium, potassium or ammonium salts or as soluble salts or organic bases, such as mono-, di- or triethanolamine or other substituted amines. The anionic surfactants also include the conventional soaps, i.e. the alkali metal salts of natural fatty acids.

Examples of nonionic surfactants are products of the addition reaction of from 3 to 40 mol, preferably from 4 to 20 mol, of ethylene oxide with 1 mol of fatty alcohol, alkylphenols, fatty acid, fatty amine, fatty acid amide or alkanesulfonamide. The abovementioned ethylene oxide addition products may also, if desired, contain up to 90% by weight, based on the condensed ethylene oxide and propylene oxide, or propylene oxide. The ethylene oxide and propylene oxide addition products may, if desired, have been modified by inclusion of butylene oxide in amounts of up to 60% by weight, based on the total content of alkylene oxide, in the condensation. Particularly important addition products are those of from 5 to 16 mol of ethylene oxide with coconut or tallow fatty alcohols, oleyl alcohol or synthetic alcohols having from 8 to 18, preferably from 12 to 18, carbon atoms, and with mono- or dialkylphenols having from 6 to 14 carbon atoms in the alkyl radicals. Besides these water-soluble monionics, however, there is also interest in water-insoluble or sparingly water-soluble polyglycol ethers containing from 1 to 4 ethylene glycol ether radicals in the molecule, in particular if the are employed together with water-soluble, nonionic or anionic surfactants.

Other suitable nonionic surfactants are water-soluble products, containing from 20 to 250 ethylene glycol either groups and from 10 to 100 propylene glycol either groups, of the addition reaction of ethylene oxide with polypropylene glycol either, alklenediaminopolypropylene glycol and alkylpolypropylene glycols having from 1 to 10 carbon atoms in the alkyl chain in which the polypropylene glycol ether chain functions as s hydrophobic radical.

Nonionic surfactants of the main oxide or sulfoxide type can also be used.

The foaming power of the surfactants can be increased or reduced by combining them with suitable types of surfactants. A reduction can also be achieved by adding non-surfactant organic substances.

Further constituents of detergents may also be monomeric, oligomeric or polymeric phosphates, ether sulfonates based on unsaturated fatty alcohols, e.g. oleyl alcohol ethoxylate butyl ether, and the alkali metal salts thereof. These substances may be characterized, for example, by the formula $RO(CH_2CH_2O)_n$-$C_4H_8$-$SO_3Na$ where n is from 5 to 40 and R is oleyl.

The above-described graft copolymers can also be used as an additive for liquid detergents, which contain liquid or solid surfactants which are soluble or at least dispersible in the formulation. Suitable surfactants here are products which are also employed in powder detergents, as well as liquid polyalkylene oxides and polyoxyalkylated compounds. If the graft copolymers are not directly miscible with the other constituents of the formulation, homogeneous mixtures can be prepared using small amounts of solubilizers, e.g. water, or a watermiscible solvent, e.g. isopropanol methanol, ethanol, glycol, diethylene glycol or triethylene glycol or corresponding propylene glycols. The amount of surfactant in the liquid detergents is from 4 to 50% by weight, based on the entire formulation, since the proportions of the constituents can also vary within broad limits in liquid detergents, depending on the characteristics of the regional market or the application.

The liquid detergents can contain water in amounts of from 10 to 60% by weight, preferably from 20 to 50% by weight. However, they may also be water-free.

Water-free liquid detergents can also contain peroxy compounds for bleaching in suspended or dispersed form. Examples of specific peroxo compounds are sodium perborate, peroxyocarboxylic acids and polymers containing some peroxo-containing groups. The liquid detergents may also contain hydrotropes, which, for the purposes of the invention, are compounds such as 1,2-propanediol, cumenesulfonate and toluenesulfonate. If compounds of this type are employed to modify the liquid detergents, their amount, based on the total weight of the detergents, is from 2 to 5% by weight. In many cases, addition of complexing agents has also proven advantageous for modifying powder and liquid detergents. Examples of complexing agents are ethylenediaminetetraaceticacid, nitrilotriacetate and isoserinediacetic acid, and phosphates, such as aminotrismethylenephosphonic acid, hydroxyethanediphosphocin acid, ethylenediaminetetraethylenephosphonic acid and salts thereof. Completing agents are employed in amounts of from 0 to 10% by weight, based on the detergents. The detergents may also contain citrates, diethanolamine, triethanolamine, opacifiers, optical brighteners, enzymes, perfume oils and dyes. If these substances are used for modifying liquid detergents, these substances together are present in amounts of up to 5% by weight. The detergents are preferably phosphate-free, but may also contains phosphates, e.g. pentasodium triphosphate and/or tetrapotassium pyrophosphate. If phosphates are employed, the proportion of phosphate in the overall formulation of the detergent is up to 45% by weight, preferably up to 25% by weight.

The graft copolymers according to the invention can also cause synergistic effects with other known detergent additives (e.g. antigraying agents, clay dispersifiers and substances which increase the primary wash action, color transfer inhibitors, bleach activators) in powder and liquid detergents (phosphate-containing and phosphate-free); these synergistic effects can increase not only the antigraying action, but also the effect of the other detergent additive.

In order to improve the properties of the graft copolymers according to the invention for use in detergents, it may in some cases be advantageous to subject the graft copolymers to subsequent oxidative treatment. To this end, oxidants are allowed to act either directly on the pulverulent graft copolymers or on suspensions of graft copolymers in an inert suspending agent of alternatively on solutions of graft copolymers in an inert solvent, e.g. in a monohydric alcohol, such as methanol, ethanol, n-propanol or isopropanol, or preferably in water or in mixtures of water and alcohols. The oxidation is preferably carried out in aqueous solutions of the graft copolymers.

Suitable oxidants are those which liberate oxygen on heating alone or in the presence of catalysts. Suitable organic compounds are generally peroxides which readily eliminate active oxygen. At low temperatures, only hydroperoxides and peracids having a significant oxidizing action; peresters, diacyl peroxides and dialkyl peroxides only work at elevated temperatrues.

Examples of suitable peroxides are diacetyl peroxide, isopropyl percarboante, tert.-butyl hydroperoxide, cumene hydroperoxide, acetylacetone peroxide, methyl ethyl ketone peroxide, di-tert.-butyl peroxide, dicumyl peroxide, tert.-butyl perpivalate, tert.-butyl peroctanoate and tert.-butyl perethylhexanoate. Preference is given to inexpensive inorganic oxidants, which are particularly suitable for oxidizing aqueous solutions of carbonyl-containing polymers. Specific examples are chlorine, bromine, iodine, nitric acid, sodium permanganate, potassium chlorate, sodium hypochlorite, sodium perborate, sodium percarbonate and sodium persulfate. A particularly preferred oxidant is hydrogen peroxide. The decomposition of the per compounds, i.e. the oxidation, can be forced by adding accelerators or activators, which are substances with a reducing action, but which readily release electrons, for example tertiary amines, sulfinic acids, dithionites, sulfites, $\alpha$- and $\beta$-keto carboxylic acids, glucose derivatives and heavy metals, preferably in the form of soluble salts of inorganic or organic acids or complexes. Specific examples are dimethylaniline, dimethyl-p-toluidine, diethylaniline, sodium dithionite, sodium sulfite, ascorbic acid, glucose, pentaacetyl glucose, ferrous ammonium sulfate, copper chloride, the acetylacetonates of iron, copper, cobalt, chromium, manganese, nickel and vanadium.

The oxidants are added in amounts of from 1 to 50% by weight, preferably from 5 to 30% by weight, based on the graft copolymers. The reducing agents are used in amounts of from 2 to 50% by weight, based on the oxidants.

The heavy metal compounds are employed in amounts of from 0.1 to 100 ppm, preferably from 0.5 to 10 ppm, calculated as the heavy metal and based on the polymers. It is frequently advantageous to accelerate the reaction, particularly using low temperatures, by adding both reducing agents and heavy-metal compounds to the per compounds. Reaction temperatures can vary from 20° to 150° C., preferably from 50° to 120° C. It is sometimes also advantageous to accelerate the oxidation by irradiation with UV light, or alternatively to carry out the oxidation at low temperatures and for a short time, particularly when only oxidation of the -S- groups present in the graft copolymer is to be carried out without the K value of the graft copolymer being significantly reduced. It is also possible to use air and oxygen, alone or in combination with oxidants, for oxidizing the graft copolymers.

During treatment of the graft copolymers with oxidants, graft copolymers having a relatively high K value, e.g. in the range from 160 to 220, are degraded to a relatively great extent. For example, oxidative treatment of these graft copolymers gives oxidized graft copolymers which have K values in the range from 15 to 60. By contrast, relatively low-molecular-weight graft copolymers, e.g. graft copolymers having K values of 20 to 70, are degraded to a relatively low extent. The K value of the relatively low-molecular-weight, oxidatively treated graft copolymers is only slightly lower or in some cases corresponds to the K values of the untreated graft copolymers. The oxidatively treated graft copolymers have a better calcium dispersion capacity than the untreated graft copolymers and, in addition, have an increased stability in oxidant-containing detergents and cleaners.

The K values of the polymers were determined by the method of H. Fikentscher, Cellulose-Chemie, Volume 13 (1932), 58 to 64 and 71 to 74, where $K = k \times 10^3$. The measurements were carried out on 1% strength aqueous solutions of the sodium salts of the graft copolymers at 25° C. and at a pH of 7. The percentage data relate to per-cent by weight, unless otherwise stated.

The DE values of the starches or derivatives denote dextrose equivalents and were determined by the method of Luff-Schoorl, cf. G. Tegge, Stärke und Stärkederivate, Behr's Verlag, Hamburg 1984, page 305.

EXAMPLES

Preparation of the graft copolymers

EXAMPLE 1

263.1 g of water, 80 g of white dextrin (soluble component 90%), 63.8 g of maleic anhydride and 3.5 g of a 0.1% strength aqueous iron(II) ammonium sulfate solution and 94 g of 50% strength aqueous sodium hydroxide solution are heated to the boil in a heated reactor equipped with stirrer, reflux condenser, thermometer, feed devices, and nitrogen inlet and outlet. The degree of neutralization of the maleic acid produced from the maleic anhydride in aqueous solution is 90.2%. When the reaction mixture has started boiling, a solution of 178.2 g of acrylic acid in 141.9 g of water is added over the course of 5 hours, and a solution of 16.6 g of 50% strength hydrogen peroxide in 44.4 g of water is added at a constant rate over the course of 6 hours at the boil. When the addition of acrylic acid is complete, the degree of neutralization of the maleic acid and acrylic acid units present in the polymer is 31.1%. When the addition of hydrogen peroxide is complete, the reaction mixture is heated at the boil for a further 1 hour, neutralized to a pH of 7.2 by adding 180 g of 50% strength aqueous sodium hydroxide solution and cooled. A cloudy, highly viscous, white solution having a solids content of 39.3% is obtained. The graft copolymer has a K value of 53 and a residual content of nonpolymerized maleic acid of 0.73%.

EXAMPLE 2

Example 1 is repeated, with the difference that the white dextrin is replaced by the same amount of maltodextrin having a DE value (by the method of Luff-Schoorl) of from 11 to 14. A cloudy, highly viscous, yellowish solution having a solids content of 39.6% is obtained. The graft copolymer has a K value of 58.3% and contains 0.3% of nonpolymerized maleic acid.

EXAMPLE 3

263.1 g of water, 160 g of dextrose, 47.9 g of maleic anhydride, 3.5 g of a 0.1% strength iron (II) ammonium sulfate solution and 70.5 g of 50% strength aqueous sodium hydroxide solution are heated to the boil in the reactor described in Example 1. The degree of neutralization of the maleic acid produced from the maleic anhydride is 90.15%. Immediately after boiling commences, a solution of 133.6 g of acrylic acid in 141.9 g of water is added over the course of 5 hours, and a solution of 12.45 g of 50% strength hydrogen peroxide in 44.4 g of water is added at a constant rate over the course of 6 hours to the boiling reaction mixture. The degree of neutralization of the copolymerized maleic acid and acrylic acid units in the graft copolymer is then 31.1%. The reaction mixture is heated at the boil for a further 1 hour, then neutralized to a pH of 7.0 using 123.7 g of 50% strength aqueous sodium hydroxide solution and cooled. A clear, low-viscosity, brownish solution having a solids content of 37.5% is obtained. The graft copolymer has a K value of 26.4 and contains 0.24% of nonpolymerized maleic acid.

EXAMPLE 4

Example 1 is repeated, the only difference being that the white dextrin is replaced by the same amount of potato starch. A cloudy, highly viscous white dispersion having a solids content of 39.4% is obtained. The residual maleic acid monomer content of the graft copolymer is 1.8%. The K value cannot be determined due to insolubility of the graft copolymer in water.

EXAMPLE 5

263.1 g of water, 120 g of white dextrin (soluble content 90%), 55.9 g of maleic anhydride, 3.5 g of a 0.1% strength aqueous solution of iron(II) ammonium sulfate and 82.2 g of 50% strength aqueous sodium hydroxide solution are introduced into the reactor described in Example 1 and heated to the boil. The degree of neutralization of the maleic acid produced from the maleic anhydride by hydrolysis is 90%. Immediately after boiling commences, a solution of 155.9 g of 97% acrylic acid in 141.9 g of water is added over the course of 5 hours and, separately, a solution of 14.5 g of 50% strength hydrogen peroxide in 44.9 g of water is added over the course of 6 hours, in both cases at a constant rate, and the reaction mixture is heated to the boil with stirring. The degree of neutralization of the maleic acid and acrylic acid units present in the copolymer is 31.7%. On completion of the addition of hydrogen peroxide, the reaction mixture is heated at the boil for a further 1 hour and then neutralized to a pH of 7 by adding 148 g of 50% strength sodium hydroxide solution. The cloudy, viscous, yellowish solution obtained has a solids content of 39.1%. The K value of the graft copolymer is 35, and the residual maleic acid monomer content is 0.03%.

EXAMPLE 6

263.1 g of water, 160 g of maltodextrin having a DE value of from 11 to 14, 47.9 g of maleic anhydride, 3.5 g of a 0.1% strength aqueous solution of iron(II) ammonium sulfate and 70.5 g of 50% strength aqueous sodium hydroxide solution are introduced into the reactor described in Example 1 and heated to the boil. The degree of neutralization of the maleic acid is 90.15%. Immediately after boiling commences, a solution of 133.6 g of 97% strength acrylic acid in 141.9 g of water is metered in over the course of 5 hours and a solution of 12.45 g of 50% hydrogen peroxide in 44.4 g of water is metered in over 6 hours, in both cases at a constant rate while maintaining the boiling of the mixture. After the addition of hydrogen peroxide is complete, the reaction mixture is heated at the boil for a further 1 hour. The degree of neutralization of the maleic acid and acrylic acid units present in the graft copolymer is 31.7%. 123.7 g of 50% strength aqueous sodium hydroxide solution are then added until the pH is 7. A clear, viscous brownish solution having a solids content of 39.7% is obtained. The graft copolymer has a K value of 37.9 and contains 0.09% of nonpolymerized maleic acid.

EXAMPLE 7

Example 6 is repeated, with the difference that the maltodextrin is replaced by a Noredux-type dextrin (Noredux E 200 from Cerestar). A clear, low-viscosity, brownish solution having a solids content of 39.8% is obtained. The graft copolymer has a residual maleic acid monomer content of 0.07% and a K value of 35.7.

EXAMPLE 8

235.4 g of maltodextrin having a DE value of from 11 to 14, 230 g of water, 117.54 g of maleic anhydride and 173 g of 50% strength aqueous sodium hydroxide solution are introduced into the reactor described in Example 1 and heated to the boil. The degree of neutralization of the resultant maleic acid is 90.1%. Immediately after boiling commences, a solution of 139.2 g of 97% acrylic acid in 300 g of water is added over the course of 5 hours and, separately, solutions of 3.2 g of sodium persulfate in 80 g of water and 10.14 g of 30% hydrogen peroxide in 60 g of water are added over the course of 6 hours, in each case at a constant rate, and the reaction mixture is polymerized at the boiling point. The maleic acid and acrylic acid units contained in the graft copolymer have a degree of neutralization of 50.6%. After the addition of hydrogen peroxide is complete, the reaction mixture is heated at the boil for a further 1 hour and neutralized by adding 137 g of 50% strength aqueous sodium hydroxide solution. A clear, viscous, brown solution having a solids content of 39% is obtained. The graft copolymer has a K value of 31.5 and contains 1.2% of monomeric maleic acid.

EXAMPLE 9

298 g of water, 136 g of dextrose, 52.7 g of maleic anhydride, 3.5 g of a 0.1% strength aqueous solution of iron(II) ammonium sulfate and 77.5 g of 50% strength sodium hydroxide solution are introduced into the reactor described in Example 1 and heated to the boil. The degree of neutralization of the maleic acid produced from the maleic anhydride by hydrolysis is 90.1%. Immediately after boiling commences, 142.6 g of acrylic acid in 141.9 g of water are added over the course of 5 hours and, separately, 13.7 g of 50% hydrogen peroxide in 44.4 g of water are added over the course of 6 hours, in both cases at a constant rate, and the polymerization is carried out at the boiling point of the mixture. The degree of neutralization of the maleic acid and acrylic acid units present in the graft copolymer is 31.7%. After the addition of hydrogen peroxide is complete, the reaction mixture is heated at the boil for a further 1 hour and then adjusted to a pH of 7 using 136 g of 50% strength aqueous sodium hydroxide solution. The clear, slightly viscous, brown solution obtained in this way has a solids content of 35%. The graft copolymer has a K value of 27 and contains 0.03% of residual maleic acid.

EXAMPLE 10

400 g of water, 320 g of dextrose, 16 g of maleic anhydride, 3.5 g of a 0.1% strength aqueous solution of iron(II) ammonium sulfate and 23.5 g of 50% strength aqueous sodium hydroxide solution are introduced into the reactor described in Example 1 and heated to the boil. The degree of neutralization of the resultant maleic acid is 90%. Immediately after boiling commences, 43.21 g of acrylic acid in 141.9 g of water is metered in over the course of 5 hours and, separately, a solution of 4.15 g of 50% hydrogen peroxide in 44.4 g of water is added over the course of 6 hours to the boiling reaction mixture. The reaction mixture is subsequently heated at the boil for a further 1 hour. The degree of neutralization of the maleic acid and acrylic acid units present in the copolymer is 31.7%. On completion of the polymerization, 20 g of 50% strength aqueous sodium hydroxide solution are added, to give a clear, slightly viscous, brown solution having a solids content of 37.5% and a pH of 7. The graft copolymer has a K value of 14.4 and contains 0.13% of residual maleic acid.

EXAMPLE 11

263.1 g of water, 194 g of potato starch (82.4%), 23.95 g of maleic anhydride and 0.57 g of phosphorous acid are introduced into the reactor described in Example 1, heated to the boil and refluxed for 1 hour with stirring. 23.95 g of maleic anhydride and 70.5 g of 50% strength aqueous sodium hydroxide solution are then added, so that the reactor contains a partially neutralized maleic acid having a degree of neutralization of 90.15%. A solution of 133.6 g of acrylic acid and 141.9 g of water is added to the boiling reaction over the course of 5 hours, as is a solution of 12.45 g of 50% hydrogen peroxide in 44.4 g of water over the course of 6 hours, in both cases at a constant rate. The degree of neutralization of the copolymerized maleic acid and acrylic acid units in the copolymer is 31.7%. After the addition of initiator is complete, the reaction mixture is heated at the boil for 1 hour and then neutralized to a pH of 7 using 125 g of 50% strength aqueous sodium hydroxide solution. The slightly cloudy, slightly viscous, pale brown solution has a solids content of 41%. The graft copolymer has a K value of 24.8 and contains less than 0.01% of nonpolymerized maleic acid.

EXAMPLE 12

384.1 g of water, 291 g of potato starch (82.4%), 32 g of maleic anhydride and 0.75 g of phosphorous acid are introduced into the reactor described in Example 1 and heated at the boil for 1 hour. 47 g of 50% strength aqueous sodium hydroxide solution are then added, so that the degree of neutralization of the maleic acid formed from the maleic anhydride is 90%. Immediately after addition of the sodium hydroxide solution to the boiling mixture, a solution of 89.1 g of acrylic acid and 71 g of water is added over the course of 5 hours and, separately, a solution of 4.98 g of 50% hydrogen peroxide in 22.2 g of water is added over the course of 6 hours, in both cases at a constant rate and under boiling conditions. The reaction mixture is subsequently stirred at the boiling point for a further 1 hour. The degree of neutralization of the maleic acid and acrylic acid units present in the graft copolymer is 31.1%. After completion of the polymerization, 108 g of 50% strength aqueous sodium hydroxide solution are added to a pH of 7. A cloudy, viscous, pale brown solution having a solids content of 38.5% is obtained. The graft copolymer has a K value of 24.1 and contains 1.4% of nonpolymerized maleic acid.

EXAMPLES 13 TO 22

Water, a natural product, 47.9 g of maleic anhydride, 0.57 g of phosphorous acid and 2 g of sodium bisulfite are introduced into the reactor described in Example 1 and stirred at 80° C. for 1 hour in a stream of nitrogen. 70.5 g of 50% strength aqueous sodium hydroxide solution are then added slowly. The degree of neutralization of the maleic acid is then 90.15%. A solution of 133.6 g of acrylic acid in 141.9 g of water is then added over the course of 5 hours at 80° C., and, in each case separately, solutions of 5.7 g of 50% hydrogen peroxide in 40 g of water and 2.85 g of sodium persulfate in 40 g of water are added over the course of 6 hours, in each case at a constant rate. The reaction mixture is then heated for a further 2 hours. The degree of neutralization of the maleic acid and acrylic acid units present in each of the copolymers is 31.13%. The amounts of water and the natural product and the data of the polymer solutions are given in the Table 1. The natural products used in Examples 13, 15, 16 and 17 are starch saccharification products (maltodextrins and glucose syrups) containing the following components:

TABLE 1

The natural products used in Examples 13, 15, 16 and 17 are starch saccharification products (maltodextrins and glucose syrups) containing the following components:

| Example | 13 | 15 | 16 | 17 |
|---|---|---|---|---|
| Dextrose [%] | 0.5 | 17 | 10 | 95 |
| Maltose [%] | 3.5 | 15 | 11 | |
| Maltotriose [%] | 6.0 | 6 | 14 | 5 |
| Higher sugars [%] | 90 | 62 | 65 | |

| Example No. | Water [g] | Starting materials Natural product Type | Amount [g] | Polymer solution Appearance | Solids content [%] | K value | pH |
|---|---|---|---|---|---|---|---|
| 13 | 243.1 | Maltodextrin, DE value 11–14 | 160 | virtually clear, colorless, viscous | 42.8 | 70 | 4.1 |
| 14 | 253.1 | Na salt of carboxymethyl-cellulose, 94% | 170.2 | cloudy, pale brown, highly viscous | 29.5 | insol. | 4.0 |
| 15 | 230 | Maltodextrin, DE value 55 (82.2%) | 195 | clear, colorless, slightly viscous | 40.3 | 57.5 | 3.7 |
| 16 | 230 | Maltodextrin, DE value 40 (81.6%) | 196 | clear, pale yellow, slightly viscous | 40.5 | 55.6 | 3.9 |
| 17 | 210 | Maltodextrin, DE value 96 (74.8%) | 214 | slightly cloudy, pale yellow, viscous | 37.2 | 49.7 | 3.9 |
| 18 | 243.1 | D-Mannitol | 160 | clear, yellowish, viscous | 42.0 | 51.5 | 3.9 |
| 19 | 230 | Wheat starch (86%) | 186 | cloudy, pale brown, viscous | 43.7 | 36.9 | 4.0 |
| 20 | 250 | Fructose | 160 | clear, brownish, slightly viscous | 37.3 | 45.6 | 3.8 |
| 21 | 243.1 | Sucrose | 160 | clear, brown, viscous | 38.5 | 45.9 | 4.0 |

TABLE 1-continued

| 22 | 83.1 | Gluconic acid (50%) | 320 | clear, brown, viscous | 38.7 | 41.5 | 3.3 |
| 23 | 243.1 | Sorbitol | 160 | slightly cloudy, yellowish, viscous | 41.8 | 62.8 | 4.1 |

EXAMPLE 24

248.9 g of maltodextrin having a DE value of from 11 to 14, 543.5 g of water, 75.75 g of maleic anhydride and 111.3 g of 50% strength sodium hydroxide solution are introduced into the reactor described in Example 1 and heated to the boil. The degree of neutralization of the resultant maleic acid is 90%. Immediately after boiling commences, a mixture of 89.7 g of acrylic acid, 119.63 g of hydroxypropyl acrylate (isomer mixture) and 106.65 g of water is added over the course of 5 hours, and, separately, solutions of 9.98 g of 30% hydrogen peroxide in 60 g of water and of 6 g of sodium persulfate in 69 g of water are added over the course of 6 hours, in each case at a constant rate, and the mixture is polymerized at the boil. After the initiator has been added, the reaction mixture is heated at the boil for a further 1 hour. The degree of neutralization of the copolymerized maleic acid and acrylic acid units is 49.8%. After the copolymerization is complete, 92 g of 50% strength aqueous sodium hydroxide solution is added to a pH of 7. The clear, brownish, viscous solution obtained in this way has a solids content of 38.5%. The graft copolymer has a K value of 33 and contains 1.1% of nonpolymerized maleic acid.

EXAMPLE 25

290 g of maltodextrin having a DE value of from 11 to 14, 470 g of water, 4.2 ml of a 0.1% strength aqueous solution of iron(II) ammonium sulfate, 101.38 g of maleic anhydride and 74.52 g of sodium hydroxide are introduced into the reactor described in Example 1 and heated to the boil. The degree of neutralization of the resultant maleic acid is 90%. Immediately after boiling commences, a mixture of 120 g of acrylic acid and 114.4 g of a 58% strength aqueous solution of the sodium salt of acrylamidomethylpropanesulfonic acid is added over the course of 5 hours and 80 g of 30% hydrogen peroxide and a solution of 24 g of sodium persulfate in 72 g of water are added over the course of 6 hours, in each case at a constant rate, and the mixture is polymerized at the boiling point. After the addition of initiator is complete, the reaction mixture is heated at the boil for a further 1 hour. The degree of neutralization of the acid groups is 53.5%. After the polymerization is complete, the reaction mixture is neutralized by adding 155 g of 50% strength aqueous sodium hydroxide solution. A clear, brown solution having a solids content of 42.3% is obtained. The graft copolymer has a K value of 27.6 and a residual maleic acid monomer content of 0.01%.

EXAMPLE 26

A graft copolymer solution prepared as in Example 2 is heated to the boil. 131 g of 30% strength hydrogen peroxide are added to the boiling mixture at a uniform rate over the course of 8 hours, giving a clear, yellow, viscous solution having a solids content of 38%. The K value of the copolymer is 32.

EXAMPLES 27 TO 34

231.4 g of water, 323 g of an 80% strength aqueous solution of a maltodextrin having a DE value of 30, 77.1 g of maleic anhydride, 0.91 g of phosphorus acid, 3.04 g of sodium disulfite, and 4.24 g of 0.1% strength aqueous iron(II)/ammonium sulfate solution are heated to 55° C. in a gentle stream of nitrogen in a reactor as described in Example 1. 113.4 g of 50% strength sodium hydroxide solution are metered in over the course of 15 minutes, during which the temperature is increased to 85° C. A monomer mixture of the composition described in Table 2 is then metered in at a uniform rate over the course of 5 hours, and a solution of 30.4 g of 30% strength hydrogen peroxide in 50 g of water is metered in at uniform rate over the course of 6 hours, in both cases at 85° C. in a gentle stream of nitrogen. The mixture is then heated at 85° C. for a further 1 hour, cooled and neutralized to a pH of about 7 using 50% strength sodium hydroxide solution.

The appearance, solids content and pH of the polymer solution and the K values of the resultant graft copolymers are given in Table 2.

TABLE 2

| Example No. | Monomer mixture | Polymer solution Appearance | Solids content [%] | K value | pH |
|---|---|---|---|---|---|
| 27 | 197.9 g of acrylic acid<br>15.2 g of acrylamide<br>150.0 g of water | yellowish, cloudy, viscous | 49.4 | 36.3 | 7.4 |
| 28 | 197.9 g of acrylic acid<br>15.2 g of hydroxyethyl acrylate<br>200.0 g of water | colorless, cloudy, viscous | 48.0 | 45.9 | 7.0 |
| 29 | 197.9 g of acrylic acid<br>15.4 g of acrylonitrile<br>150.0 g of water | yellowish, cloudy, viscous | 48.0 | 42.5 | 7.4 |
| 30 | 184.7 g of acrylic acid<br>30.8 of methyl acrylate<br>150.0 g of water | colorless, cloudy, viscous | 48.1 | 44.3 | 7.2 |
| 31 | 184.7 g of acrylic acid<br>30.8 g of vinyl acetate<br>150.0 g of water | colorless, cloudy, viscous | 47.5 | 42.1 | 7.4 |
| 32 | 184.7 g of acrylic acid<br>30.8 g of dimethylaminopropylmethacrylamide<br>150.0 g of water | yellowish, cloudy, viscous | 48.8 | 34.1 | 7.2 |
| 33 | 171.1 g of acrylic acid<br>15.5 g of vinyl acetate | colorless, cloudy, viscous | 47.3 | 42.6 | 7.2 |

TABLE 2-continued

| Example No. | Monomer mixture | Polymer solution Appearance | Solids content [%] | K value | pH |
| --- | --- | --- | --- | --- | --- |
| 34 | 15.5 g of methyl acrylate<br>15.5 g of hydroxypropyl acrylate<br>150.0 g of water<br>207.9 g of acrylic acid<br>5.2 g of polyethylene glycol diacrylate having a molecular weight of 1500<br>150.0 g of water | colorless, virtually clear, very viscous | 48.5 | 76.1 | 7.1 |

EXAMPLE 35

154.5 g of water, 316 g of hydroxypropyl potato starch, 80% strength (viscosity 100 mPas in 10% aqueous solution at 20° C.), 74.2 g of maleic anhydride, 0.88 g of phosphorus acid and 2.93 g of sodium disulfite are heated to 55° C. in a gentle stream of nitrogen in a reactor as described in Example 1. When 50° C. has been reached, 109 g of 50% strength sodium hydroxide solution are metered in, and the temperature is simultaneously increased to 80° C. A solution of 204.9 g of acrylic acid and 180 g of water are metered in at a uniform rate over the course of 5 hours, and a solution of 8.78 g of 50% strength hydrogen peroxide in 46 g of water and a solution of 4.39 g of sodium persulfate in 57.6 g of water are metered in at a uniform rate over the course of 6 hours, in both cases at 80° C. in a gentle stream of nitrogen. The mixture is then heated at 80° C. for a further hour, cooled and neutralized to pH 6.8 using 50% strength sodium hydroxide solution, and then diluted with 230 g of water. The clear, virtually colorless, highly viscous solution obtained has a solids content of 41.1%, and the K value of the polymer is 81.9.

EXAMPLES 36 TO 39

154.5 g of water, 316 g of maltodextrin having a DE value of 40, 74.2 g of maleic anhydride, 0.88 g of phosphorus acid and 2.53 g of sodium disulfite are heated to 55° C. in a gentle stream of nitrogen in a reactor as described in Example 1. When this temperature has been reached, the mixture is neutralized using 109 g of a 50% strength sodium hydroxide solution and the temperature is increased to 80° C. A solution of 204.9 g of acrylic acid and 180 g of water is metered in at a uniform rate over the course of 5 hours and an initiator solution, as indicated in Table 3 below, is metered in at a uniform rate over the course of 6 hours, in both cases at 80° C. in a gentle stream of nitrogen. The mixture is subsequently heated at 80° C. for a further 1 hour, cooled and neutralized to pH 7 using 50% strength sodium hydroxide solution and diluted with 230 g of water. The appearance, solids content and K value are given in Table 3.

TABLE 3

| Example No. | Initiator solution | Polymer solution Appearance | Solids content [%] | K value |
| --- | --- | --- | --- | --- |
| 36 | 8.5 g of 2,2'-azobis(2-methylpropionamidine) dihydrochloride<br>100 g of water | brownish, clear, viscous | 42.1 | 65 |
| 37 | 8.5 g of 2,2'-azobis[2-(2-imidazolin-2-yl)-propane] dihydrochloride<br>100 g of water | brown, clear, viscous | 42.0 | 66 |
| 38 | 11.5 g of tert.-butyl peroxypivalate, 75% strength in an aliphatic solvent<br>50 g of isopropanol | yellow, cloudy, viscous | 41.6 | 58 |
| 39 | 8.5 g of tert.-butyl perethylhexanoate<br>50 g of isopropanol | yellow, cloudy, viscous | 41.5 | 59 |

COMPARATIVE EXAMPLES

Comparative Example 1 (as in JP-A-12350/87)

34 g of dextrose and 400 g of water are heated at 80° C. for 1 hour under a nitrogen atmosphere in the reactor described in Example 1. The reaction mixture is then cooled to 30° C., 66 g of acrylic acid, 0.005 g of L-ascorbic acid and 0.05 g of 30% hydrogen peroxide are added, and the mixture is polymerized at 40° C. for 4 hours. After the polymerization is complete, the pH is adjusted to 7 by adding 30% strength aqueous sodium hydroxide solution. A highly viscous, cloudy solution having a solids content of 18% is obtained. The K value of the polymer is 172.

Comparative Example 2

265.6 g of maltodextrin having a DE value of from 11 to 14, 398.4 g of water and 1.8 g of phosphorous acid are introduced into the reactor described in Example 1 and heated to 95° C. in a stream of nitrogen. 294.6 g of acrylic acid and a solution of 13.2 g of 2-mercaptoethanol in 55 g of water are added over the course of 4 hours and, separately, a solution of 2.94 g of sodium persulfate in 70 g of water is added over the course of 4.5 hours, in both cases at a constant rate at 95° C. After the initiator has been added, the reaction mixture is heated at 95° C. for a further 1 hour. The mercaptoethanol which has not been incorporated into the graft polymer is then removed by steam distillation. The reaction mixture is then neutralized to a pH of 7 by adding 335 g of 50% strength aqueous sodium hydroxide solution. The pale brown, cloudy solution has a solids content of 37.3%. The copolymer has a K value of 22.9.

Comparative Example 3

80 g of the 40% strength aqueous solution of the sodium salt of a copolymer comprising 70% by weight of acrylic acid and 30% by weight of maleic acid and having a K value of 60 are mixed thoroughly with 20 g of a 40% strength solution of white dextrin. The mixture is tested as an additive for detergents.

Comparative Example 4

70 g of a 40% strength aqueous solution of the sodium salt of a copolymer comprising 70% by weight of acrylic acid and 30% by weight of maleic acid and having a K value of 60 are mixed thoroughly with 30 g of a 40% strength solution of white dextrin.

Comparative Example 5

60 g of a 40% strength aqueous solution of the sodium salt of a copolymer comprising 70% by weight of acrylic acid and 30% by weight of maleic acid and having a K value of 60 are mixed thoroughly with 40 g of a 40% strength solution of a Noredux-type dextrin (Noredux E 200 from Cerestar).

Comparative Example 6

60 g of a 40% strength aqueous solution of the sodium salt of a copolymer comprising 70% by weight of acrylic acid and 30% by weight of maleic acid and having a K value of 60 are mixed with 40 g of a 40% strength solution of dextrose.

Comparative Example 7

60 g of a 40% strength aqueous solution of the sodium salt of a copolymer comprising 70% by weight of acrylic acid and 30% by weight of maleic acid and having a K value of 60 are mixed thoroughly with 40 g of a 40% strength suspension of potato starch.

Comparative Example 8

A 40% strength solution of the sodium salt of a copolymer comprising 70% by weight of acrylic acid and 30% by weight of maleic acid and having a K value of 60 is tested as an additive for detergent formulations.

APPLICATION EXAMPLES

In order to test the encrustation-inhibiting action of the above-described graft copolymers, the polymers were incorporated into each of two different powder detergents A and B. Test cotton fabrics were washed with each of these formulations. The number of wash cycles was 10. After each cycle, the fabric was ironed dry. After this number of washes, the ash content of each of the fabrics was determined. The more effective the polymer present in the detergent, the lower the ash content of the test fabric and the higher the percentage effectiveness indicated, i.e. an effectiveness of 0% indicates the ash content or encrustation buildup achieved without an additive in the detergent formulation. An effectiveness of 100% indicates that the encrustation inhibitor completely prevents deposition. A negative action or an action which is less than zero indicates that the substance has an encrustation-promoting effect. An ash content with addition of polymer which is higher than without addition of polymer has the same meaning.

The following formula is used to calculate the effectiveness "W" from the ash contents.

$$W = \left(1 - \frac{\text{Ash content with polymer}}{\text{Ash content without addition of polymer}}\right) \cdot 100$$

The cotton fabric had an ash content of 4.14% after 10 wash cycles using detergent A and an ash content of 2.33% using detergent B.

Experimental conditions for determining the encrustation:
Instrument: Atlas, Chicago, Launder-O-Meter
Number of wash cycles: 10
Wash liquor: 250 g, the water used having a hardness of 4 mmol per liter (calcium:magnesium molar ratio = 3:1)
Wash time: 30 minutes at 60° C. (including time)
Amount of detergent: 8 g/l
Cotton fabric: 20 g
Detergent A (phosphate-free)
12.5% of dodecylbenzenesulfonate (50%)
4.7% of $C_3/C_{15}$-oxo alcohol polyglycol ether containing 7 ethylene oxide units
2.8% of soap
25% of zeolite A
12% of sodium carbonate
4% of sodium disilicate
1% of magnesium silicate
20% of sodium perborate
5% of a polymer as in the Examples and Comparative Examples (in each case calculated as 100%)
0.6% of sodium carboxymethylcellulose
remainder to 100% sodium sulfate
Detergent B (reduced phosphate)
12.5% of dodecylbenzenesulfonate (50%)
4.7% of $C_{13}/C_{15}$-oxo alcohol polyglycol ether containing 7 ethylene oxide units
2.8% of soap
9.25% of pentasodium triphosphate
0.7% of sodium diphosphate
0.05% of sodium orthophosphate
24% of zeolite A
4% of sodium disilicate
1% of magnesium silicate
20% of sodium perborate
3% of a polymer as in the Examples and Comparative Examples (in each case calculated at 100%)
remainder to 100% sodium sulfate

TABLE 2

| Encrustation inhibition of the polymers according to the invention | | | |
|---|---|---|---|
| Example | Graft copolymer prepared as in Example | Action (%) in Detergent A | Detergent B |
| 40 | 1 | 48.8 | 75.6 |
| 41 | 2 | 57.7 | 71.6 |
| 42 | 3 | 52.0 | 64.6 |
| 43 | 4 | 48.4 | 75.6 |
| 44 | 5 | 54.6 | 69.3 |
| 45 | 6 | 50.3 | 72.2 |
| 46 | 7 | 53.0 | 76.4 |
| 47 | 9 | 47.0 | 62.0 |
| 48 | 10 | 30.3 | 44.7 |
| 49 | 12 | 51.5 | 75.6 |
| 50 | 13 | 52.5 | 76.0 |

TABLE 2-continued

Encrustation inhibition of the polymers according to the invention

| Example | Graft copolymer prepared as in Example | Action (%) in Detergent A | Action (%) in Detergent B |
|---|---|---|---|
| 51 | 14 | 54.5 | 77.5 |
| 52 | 15 | 50.5 | 77.0 |
| 53 | 16 | 59.9 | 78.9 |
| 54 | 17 | 53.0 | 77.9 |
| 55 | 18 | 53.0 | 74.4 |
| 56 | 19 | 51.5 | 78.0 |
| 57 | 20 | 40.3 | 78.5 |
| 58 | 21 | 50.5 | 78.7 |

The graft copolymers 22 to 39 are found to have actions of 59 to 77% when tested for encrustation inhibition in detergent B by a method similar to that of Examples 40 to 58. These values are distinctly higher than those for the compounds tested in Comparative Examples 1 to 7 as encrustation inhibitors.

TABLE 3

Encrustation inhibition of the polymers from the Comparative Examples

| Graft copolymer as in Comparative Example | Action (%) in Detergent A | Action (%) in Detergent B |
|---|---|---|
| 1 | −41 | −50 |
| 2 | 40 | 19.9 |
| 3 | 45.8 | 55.6 |
| 4 | 40.8 | 49.2 |
| 5 | 31.9 | 47.5 |
| 6 | 41.3 | 45.1 |
| 7 | 36.7 | 45.0 |
| 8 | 52.0 | 78.7 |

The applicational results regarding encrustation inhibition show that the polymers according to the invention have a considerably greater effect in Table 2 than the graft polymers of the prior art (Comparative Examples 1 and 2) in Table 3.

Comparison of the physical mixtures of natural product and commercially available copolymer (this copolymer is a highly effective encrustation inhibitor) as in EP-B-0,025,551) (cf. Comparative Examples 3 to 7) with the polymers 1, 3, 5, 7 and 11 according to the invention shows that the graft copolymers according to the invention have a considerably greater effect than the corresponding mixtures.

If the graft copolymers according to the invention are compared with a commercially available copolymer (Comparative Example 8), it is observed, surprisingly, that the polymers according to the invention, in spite of the high natural product content, are in some cases better in the phosphate-free detergent formulation, which is forward-looking from an ecological point of view.

This effect is particularly surprising since the presence of the carboxyl-free or low-carboxyl natural product considerably reduces the proportion of carboxyl groups in the graft copolymers according to the invention compared with the pure copolymer (Comparative Example 8) comprising acrylic acid and maleic acid.

The biodegradation of the graft copolymer of Example 5 was compared with that of the copolymer of Comparative Example 8 by the Zahn-Wellens method (DIN 38,142, Part 24, Static Test (L 25)). The decrease in carbon after various times is shown by Table 4.

TABLE 4

| Polymer from | Decrease in C in % after | | | | |
|---|---|---|---|---|---|
| | 3 hours | 1 day | 2 days | 14 days | 28 days |
| Example 5 | 38 | 48 | 57 | 74 | 98 |
| Comparative Example 8 | 95 | 96 | 98 | 100 | — |

Whereas the copolymer of Comparative Example 8 exhibits clear elimination on sewage sludge, at least partial biodegradation can be concluded for the graft copolymer according to the invention from Example 5.

EXAMPLES 59 TO 63

The encrustation-inhibiting effect of the graft copolymer prepared as in Example 17 in the presence of bleach activators was investigated in accordance with the abovementioned procedure. First, the bleach activators indicated in Table 5 were added, in each case in an amount of 3%, to the above-described detergent B, and the ash content without addition of polymer was determined. In order to determine the ash content with the polymer, each of the bleach activators indicated in Table 5 was added in an amount of 3% to detergent B as well as in each case 3% of the graft copolymer prepared as in Example 17, in the form of the sodium salt. The effectiveness "W" was calculated as indicated above from the two measurement series determined for the ash contents. These values are given in Table 5.

TABLE 5

Encrustation inhibition of the sodium salt of the graft copolymer prepared as in Example 17 in the presence of bleach activators in detergent B.

| Example | Bleach activator | Effect % |
|---|---|---|
| 59 | Tetraacetylethylenediamine | 79.6 |
| 60 | Pentaacetylglucose | 77.5 |
| 61 | Tetraacetylglucouril | 75.3 |
| 62 | Dodecyloxybenzenesulfonate | 80.7 |
| 63 | Diacetyldioxohexahydrotriazine | 76.7 |
| Comp. Ex. 9 | No bleach activator | 77.9 |

A comparison of the effectiveness values from Table 5 with the copolymer of Comparative Example 8 (cf. Table 3) shows that the graft copolymer prepared as in Example 17 is, in combination with bleach activators, a very good encrustation inhibitor.

The above-described graft copolymers provide very good encrustation inhibition even in the presence of other detergent additives, for example complexing agents, antigraying agents and dispersants. Table 6 shows the results of examples in which the encrustation-inhibiting effect of the graft copolymer prepared as in Example 17, in the form of the sodium salt, was investigated in the presence of various other detergent additives (referred to as additives in Table 6) in detergent B. The composition of the detergent formulation in Examples 64 to 69 is shown in Table 6.

TABLE 6

| Example | % of graft copolymer in detergent B | % of additive in detergent B | Encrustation-inhibiting effect % |
|---|---|---|---|
| 64 | 3 | 0.5 of ISDA | 80.7 |
| 65 | 3 | 0.5 of NTA | 80.0 |
| 66 | 1.5 | 1.5 of copolymer of Comp. Ex. 8 | 78.6 |
| 67 | 1.5 | 1.5 of the sodium salt | 74.5 |

TABLE 6-continued

| Example | % of graft copolymer in detergent B | % of additive in detergent B | Encrustation-inhibiting effect % |
|---|---|---|---|
| | | of homopolyacrylic acid | |
| 68 | 3.0 | 0.5 of graft copolymer PEO/VAc | 81.0 |
| 69 | 3.0 | 0.5 of oligoester | 75.6 |

ISDA = isoserinediacetic acid Na salt
NTA = nitrilotriacetic acid Na salt
Homopolyacrylic acid Na salt having a K value of 30
Graft copolymer PEO/VAc = graft polymer of vinyl acetate on polyethylene oxide having a molecular weight (number average) of 6,000 g/mol in a weight ratio 1.6:1 as described in U.S. Pat. No. 4,746,456
Oligoester = oligoester of terephthalic acid/ethylene glycol/PEO having a molecular weight (number average) of 1,500 g/mol in the weight ratio 19.4:3.5:77.1.

In addition, other builders and/or cobuilders and combinations thereof can be employed. In this connection, mention may be made of zeolites, bentonite, crosslinked polycarboxylates of acrylic acid, maleic acid and other unsaturated carboxylic acids or dicarboxylic acids, hydroxymono(di, tri)carboxylic acids, for example citric acid or tartaric acid.

We claim:

1. A graft copolymer of monosaccharides, oligosaccharides, polysaccharides and derivatives thereof, which is obtainable by free radical-initiated copolymerization of
   (A) a monomer mixture comprising
   (a) from 90 to 10% by weight of a monoethylenically unsaturated $C_4$- to $C_8$-dicarboxylic acid, or an anhydride, alkali metal salt or ammonium salt thereof,
   (b) from 10 to 90% by weight of a monethylenically unsaturated $C_3$- to $C_{10}$-carboxylic acid, or an alkali metal salt or ammonium salt thereof,
   (c) from 0 to 40% by weight of another monoethylenically unsaturated monomer which can be copolymerized with monomers (a) and (b), and
   (d) from 0 to 5% by weight of a monomer containing two or more ethylenically unsaturated, non-conjugated double bonds in the molecule,
   in the presence of
   (B) a monosaccharide, oligosaccharide, polysaccharide, oxidatively, hydrolytically or enzymatically degraded polysaccharide, oxidized, hydrolytically or enzymatically degraded polysaccharide, or chemically modified monosaccharide, oligosaccharide or polysaccharide, or a mixture of said compounds,
   in the weight ratio (A):(B) of (95 to 20):(5 to 80).

2. A detergent or cleaning agent which contains surfactants as the essential constituents, containing from 0.1 to 20% by weight of a graft copolymer obtainable by free radical-initiated copolymerization of
   (A) monomer mixtures of
   (a) from 90 to 10% by weight of a monoethylenically unsaturated $C_4$- to $C_8$-dicarboxylic acid, or an anhydride, alkali metal salt and/or ammonium salt thereof,
   (b) from 10 to 90% by weight of a monoethylenically unsaturated $C_3$- to $C_{10}$-carboxylic acid, or an alkali metal salt and/or ammonium salt thereof,
   (c) from 0 to 40% by weight of another monoethylenically unsaturated monomer which is copolymerizable with monomers (a) and (b), and
   (d) from 0 to 5% by weight of a monomer containing two or more ethylenically unsaturated, non-conjugated double bonds in the molecule,
   in the presence of
   (B) a monosaccharide, oligosaccharide, polysaccharide, oxidatively, hydrolytically or enzymatically degraded polysaccharide, oxidized, hydrolytically or enzymatically degraded polysaccharie, or chemically modified monosaccharide, oligosaccharide or polysaccharide, or a mixture of said compounds,
   in the weight ratio (A):(B) of (95 to 20):(5 to 80).

3. A graft copolymer as claimed in claim 1 wherein component (B) is selected from the group consisting of a monosaccharide, an oligosaccharide, a polysaccharide or a mixture thereof.

* * * * *